Figure 1:
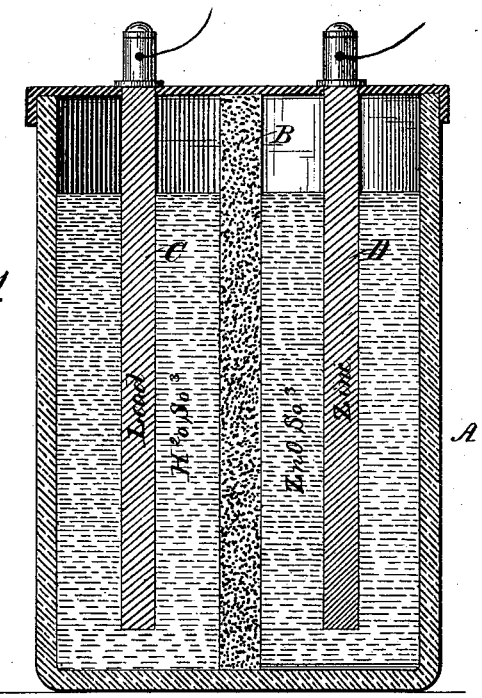

(No Model.)

W. S. HOGG.
BATTERY.

No. 307,945. Patented Nov. 11, 1884.

Witnesses:
Inventor:

UNITED STATES PATENT OFFICE.

WILLIAM S. HOGG, OF THE UNITED STATES NAVY.

BATTERY.

SPECIFICATION forming part of Letters Patent No. 307,945, dated November 11, 1884.

Application filed June 10, 1884. (No model.)

*To all whom it may concern:*

Be it known that I, WILLIAM S. HOGG, a citizen of the United States, an officer of the United States Navy, have invented certain new and useful Improvements in Batteries, of which the following is a specification.

My invention relates to batteries, and more especially to that class which, while capable of action as a primary battery to some extent, is more particularly intended for use as a secondary or storage battery; and it has for its object to produce a battery that is more constant in its action than those heretofore used, and capable of generating and maintaining a higher electro-motive force, while at the same time it is cheap, simple, light, and less liable to get out of order.

In carrying out my invention I use an ordinary cell or jar for containing the electrodes and exciting-fluids, preferably divided into two portions or compartments by a porous partition or cup. Into one of the compartments is placed an electrode of zinc, preferably amalgamated, in a solution of sulphate of zinc; or the zinc may be immersed in sulphuric acid, which will attack the zinc, forming the sulphate of zinc. In the other compartment is placed an electrode of lead, the preferred form being a mechanical mixture of pure lead and red lead, in dilute sulphuric acid.

In using this battery as a secondary or "storage" battery, so called, the action is as follows: In charging, the current is made to enter by the lead plate or positive electrode, and, passing through the liquid, leaves at the zinc electrode. The result is that the liberated oxygen unites with the lead, forming binoxide of lead, which is insoluble in the acid and highly negative. The hydrogen liberated at the zinc or negative electrode attacks the zinc oxide in the solution, depositing pure zinc on the plate and diluting the solution of sulphate of zinc. The deposited zinc, if well amalgamated, and this may be attained by placing a little mercury in the bottom of the compartment, is but slightly, if at all, acted upon until the circuit is closed, and the battery will remain charged for a considerable time without appreciable loss. It is preferable to begin by filling the compartment containing the zinc electrode with a saturated solution of sulphate of zinc and to have the electrode well amalgamated, which may be done in any of the ordinary ways, or, as suggested above, by placing a small quantity of mercury in the compartment containing the zinc, or by adding a salt or oxide of mercury or sodium or potassium with mercury in the compartment. The electro-motive force of this battery when so charged is comparatively very high, being in the neighborhood of 2.3 volts, or that between pure zinc and the binoxide of lead. The weight of the deposited zinc is a true measure of the quantity of current that may be returned, and this deposit is dependent upon the formation of the lead plate, and on this account it is preferable not to use a pure lead plate, but some form that will take up as much oxygen as possible; and I have found that a plate consisting of a mechanical mixture of pure lead and an oxide of salt or lead, with or without other active or inert material, produces the best results. The electrode may be of any shape so as to increase the active surface and conductivity and decrease the weight. The zinc electrode may be in any desired form to decrease its weight and increase its conductivity, and be cast, pressed, granulated, or deposited on a frame, and may be pure zinc, or zinc amalgamated, or a salt or oxide of zinc, as none of these features are essentials to my invention, but are merely adjuncts to the principle thereof, and may be used as circumstances indicate.

It is evident that this battery may be used as a primary battery and that such action will not be disadvantageous to its use as a secondary battery, as any zinc consumed in such use can be again deposited in charging, and the hydrogen assists in forming the lead plate; but the electro-motive force as a primary battery is not great, as the difference in potential between the electrodes is small, and the battery sooner or later becomes polarized.

Figure 2:
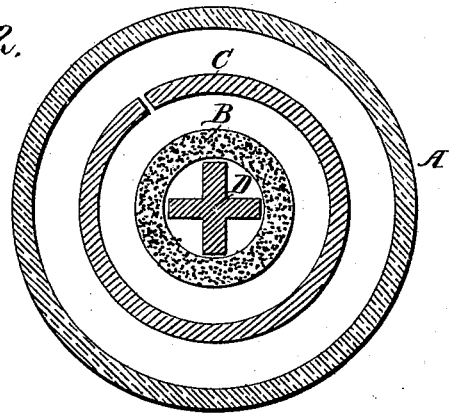

The accompanying drawings is a conventional representation of two forms of batteries, Figure 1 showing a section of a rectangular cell with the porous partition therein, and Fig. 2 a section of a cylindrical cell with a cylindrical porous cup.

A is the exterior case or cell; B, the porous partition or cup; C, the lead plate in dilute sulphuric-acid solution; D, the zinc plate in the sulphate-of-zinc solution.

Heretofore it has been proposed to use zinc and lead electrodes in a solution of sulphate of zinc.

My invention differs from this, in that the zinc is held in a solution of sulphate of zinc and the lead is held in an acid solution, and a porous cup or partition separates the two electrodes. This cup prevents the zinc being deposited on the lead plate as it is dissolved in the solution of sulphate of zinc, allows the zinc to be kept amalgamated without amalgamating the lead, prevents short-circuiting by detached particles of lead oxide or zinc, and prevents the undue mixture of the electrolytes.

Having thus described my invention, what I claim is—

1. A battery consisting of a cell having a porous partition, and an electrode of zinc in a solution of sulphate of zinc, and an electrode of lead in dilute sulphuric acid, substantially as described.

2. A battery consisting of a cell separated into two compartments by a porous partition, in one of which is a metal electrode in a solution of the salt of the metal, and in the other an electrode of lead in an acid solution, as set forth.

In testimony whereof I have signed my name to this specification in the presence of two subscribing witnesses.

W. S. HOGG.

Witnesses:
CHARLES E. FOSTER,
L. C. YOUNG.